March 7, 1933.  W. E. SOMERVILLE  1,900,310
TWISTER OR STRANDER
Filed Nov. 20, 1931   2 Sheets-Sheet 1
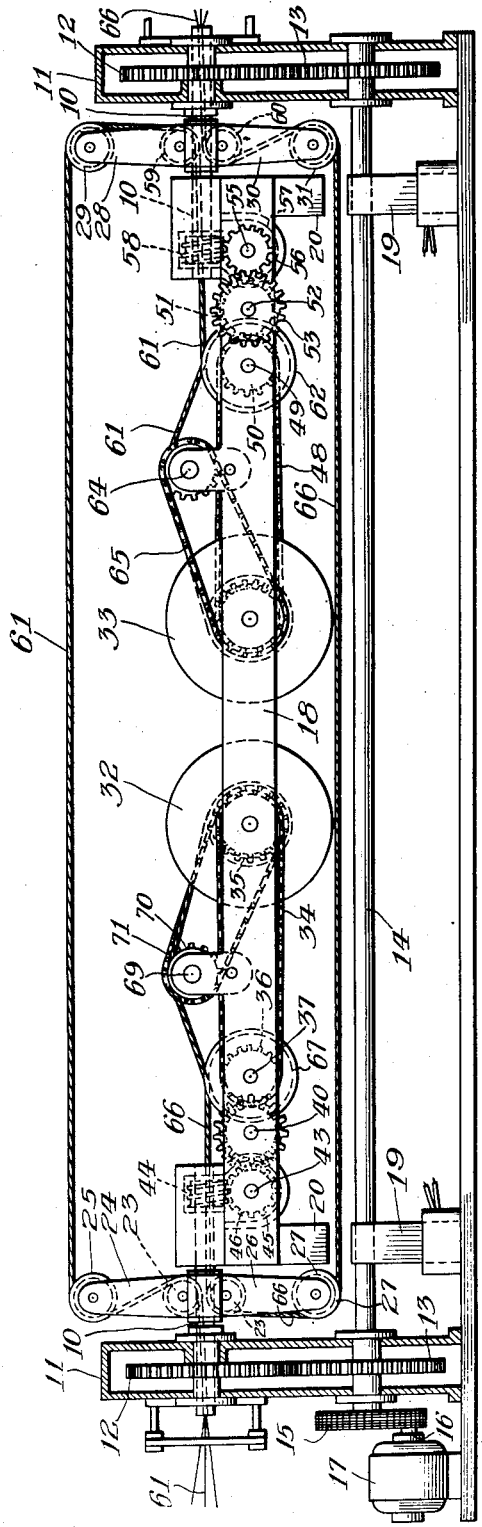
Inventor:
William E. Somerville
By ... Attorney March 7, 1933. W. E. SOMERVILLE 1,900,310
TWISTER OR STRANDER
Filed Nov. 20, 1931 2 Sheets-Sheet 2
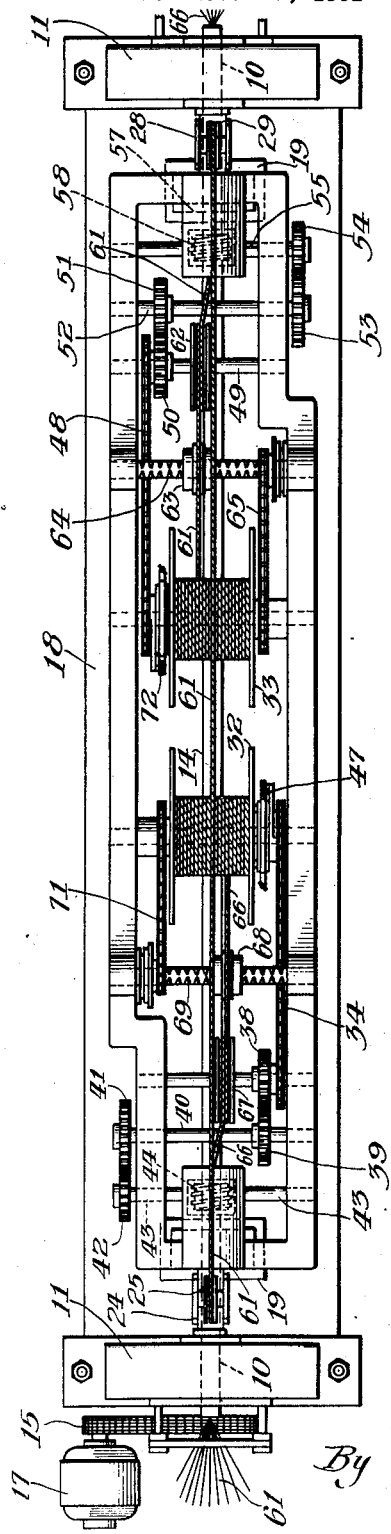
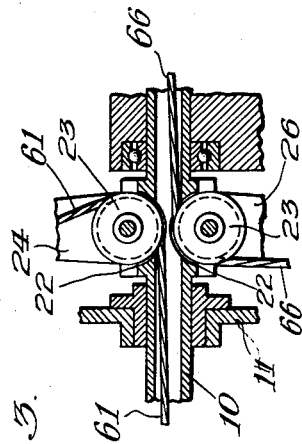
Inventor:
William E. Somerville,
By 
Attorney Patented Mar. 7, 1933

1,900,310

UNITED STATES PATENT OFFICE

WILLIAM E. SOMERVILLE, OF COAL CITY, ILLINOIS

TWISTER OR STRANDER

Application filed November 20, 1931. Serial No. 576,327.

This invention relates to twisting or stranding machines, particularly adapted though not necessarily limited in its use in the manufacture of wire cable or rope.

Heretofore in machines of this character the twisting mechanism has been mounted upon a revolving cage, and as the cage has generally been in the form of a frame within which the mechanism has been mounted, it has been necessary in order to produce the desired results, to rotate not only the twisting mechanism per se, but also the cage, and this has necessitated the employment of considerable power.

It is one of the objects of the present invention to produce a simple, inexpensive and light structure of this character, necessitating the employment of considerably less power to operate the same, and at the same time provide an improved structure whereby a plurality of cables or ropes may be simultaneously produced.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a side elevation of a machine of this character constructed in accordance with the principles of this invention.

Figure 2 is a top plan view of Figure 1.

Figure 3 is a detail sectional view on an enlarged scale, of the hollow supporting shaft and the guide pulleys connected therewith.

Referring more particularly to the drawings, the numeral 10 designates supporting axles, two of which are employed and are spaced from each other lengthwise of the axes thereof. Each of the axles is supported in suitable bearings preferably in the walls of housings 11, and connected to the axles within the respective housings are gears 12—13, the latter being secured to a shaft 14 for rotation therewith, and the shaft 14 is journaled in a suitable bearing preferably in the walls of the housings.

Connected with the shaft 14 is a suitable pulley over which a drive belt 15 passes, and the belt also passes over a pulley secured to the shaft 16 of a motor 17 so that motion will be imparted from the motor to the shaft 14 and from the shaft through the gears 13 to the intermeshing gears 12 to rotate the respective shafts 10.

Arranged between the shafts 10 is a cradle 18 which is pivotally mounted upon the shafts and is supported thereby, the cradle being provided with a low center of gravity so that the same will be held substantially stationary and against rotation with the shafts 10 when the latter are operated. As an additional means for maintaining the cradle 18 against rotation there may be provided electric control devices preferably in the form of magnets 19, with which armatures 20 carried by the cradle 18 cooperate and the magnets are suitably spaced below the armatures 20.

Each of the shafts 10 is hollow as at 21 and is provided with openings 22 extending through the lateral faces thereof. Suitable pulleys 23 are arranged adjacent these openings 22 and project into the hollow portion 21 of the shaft 10, the peripheries of the pulleys being spaced from each other a suitable distance so as to permit portions of two cables to pass through the shaft and the peripheries of the pulleys 23 are disposed in alinement with the opening in the shafts.

Secured to one end of the shafts 10 at one end of the machine to project laterally therefrom is an arm 24 carrying a roller or pulley 25 and secured to the same shaft is another arm 26 having a roller 27 mounted thereon. These arms 24—26 are so disposed with respect to each other that one will balance the other in the rotation of the shaft 10.

Secured to the other shaft 10 at the other end of the machine is an arm 28 corresponding to the arm 24 and having mounted thereon a pulley 29. A similar arm 30 is secured to the same shaft 10 and corresponds with the arm 26. A pulley 31 is mounted upon the arm 30 and the arm 30 and pulley 31 counter-balance the arm 30 and pulley 28—29.

Mounted upon the cradle 18 are two take up reels 32—33. The take up reel 32 receives its motion by means of an endless belt or chain 34 passing over a pulley or sprocket wheel 35 secured to the shaft upon which the take up reel 32 is mounted. The belt or chain 34 also passes over a sprocket wheel 36 secured to a shaft 37 and secured also to the shaft 37 is a gear 38 which meshes with a gear 39 on a shaft 40. Secured also to the shaft 40 for rotation therewith is a gear 41 which in turn meshes with a gear 42 secured to a shaft 43 for rotation therewith. Secured also to the shaft 43 is a worm gear 44 arranged within a housing 45, and meshing with the worm gear 44 is a worm 46, which in turn is secured to the shaft 10 for rotation therewith, so that when the shaft 10 is rotated, motion will be imparted through the gear connection and drive belt or chain 34 to the take up reel 32.

A suitable brake designated generally by the reference numeral 47 of any desirable construction may be provided for controlling the rotation of the reel 32.

At the other end of the cradle is arranged a driving belt or chain 48 which passes over a pulley or sprocket secured to the shaft on which the take up reel 33 is mounted. This sprocket chain or belt 48 also passes over a suitable sprocket or pulley secured to a shaft 49 for rotation therewith and secured also to the shaft 49 is a gear 50 which meshes with a gear 51 secured to a shaft 52. Secured also to the shaft 52 is a gear 53 which meshes with a gear 54 secured to a shaft 55 for rotation therewith, and secured also to the shaft 55 is a worm gear 56 mounted within a housing 57. The worm gear 56 meshes with a worm 58 secured to the shaft 10 at the adjacent end of the cradle so that when the shaft 10 is rotated the take up reel 33 will also be rotated through the medium of the intermediate or connecting gears.

The shaft 10 at the other end of the machine is constructed in the same manner as the shaft 10 at the left hand end of the machine and is hollow with lateral openings adjacent which pulleys 59—60 are arranged.

The strands 61 which are fed to the left hand end of the machine pass through the hollow shaft 10 over the pulley 23 carried by the arm 24 and thence over the pulley 25 on said arm, passing then to the opposite end of the machine and over the pulley 29, thence around the pulley 59, through the hollow shaft 10 at the right hand end of the machine and thence around a draw off mechanism 62, in the form of a reel and wrapped any desired number of times around the draw off reel and thence to the take up reel 33.

On its passage from the draw off reel 62 to the take up reel 33, the cable which has been formed by the strands passes over a guide pulley 63, which controls the lay or wrap of the rope or cable upon the take up reel 33, and to that end the guide pulley 63 is adapted to be given a reciprocatory movement in directions lengthwise of the axes of the take up reel 33. This may be accomplished in any suitable manner, but preferably through the medium of a double screw shaft 64 which is given a reciprocatory movement in any desired or suitable manner by means of a belt or chain 65 which passes over a pulley 65ª connected with the shaft on which the take up reel 33 is mounted and thence over a sprocket wheel or pulley connected with the shaft 64, so that when the take up reel 33 is rotated the shaft 64 will be correspondingly rotated and this will cause the guide pulley 63 to be moved backwardly and forwardly with respect to the shaft 64.

The same mechanism is arranged at the other end of the machine, that is the strands 66 will be fed into the machine from the right hand end and will pass through the tubular shaft 10, thence around the pulley 60, thence over the pulley 31 carried by the arm 30 across and beneath the cradle 18 to the other end thereof to pass over the pulley 27 carried by the arm 26, thence over the pulley 23, through the tubular shaft 10 to a draw off reel 67 mounted upon the shaft 36 for rotation therewith. The cable or rope is then wrapped one or more times around the draw off reel 67 and thence passes over a guide reel or pulley 68 to control the lap or lay of the rope or cable upon the take up reel 32. This guide pulley 68 is given a reciprocatory movement in the same manner as the guide pulley 63 at the other end of the machine that is, through the medium of a double screw shaft 69 to which a sprocket wheel 70 is connected, over which a sprocket chain 71 passes and the sprocket chain also passes over a suitable sprocket wheel carried by the shaft on which the take up reel 32 is mounted. Thus, it will be seen that when the shaft 10 at the left hand end of the machine is rotated, the draw off reel 67 and take up reel 32 will be rotated and the guide pulley 68 will be reciprocated with respect to the shaft 69 to guide or direct the rope or cable to the take up reel 32 and insure a proper lay or wrap thereof.

Obviously a brake mechanism 72 may be employed for the take up reel 33 if desired.

With this improved construction it will be manifest that the cradle 18 will be held substantially stationary, and will be maintained against rotation with the arms 24—26 and 28—30, the electric elements 19 being provided to insure the holding the cradle against rotation.

The strands of the two cables will be fed from opposite ends of the machine and as the arms 24—26 and 28—30 are rotated, they will be given a rotary movement with respect to the cradle 18 and by reason thereof they will effect a twisting of the strands into two separate and distinct cables. These cables will be fed to their respective draw off and take up reels, with the result that two separate and independent cables will be simultaneously formed upon this machine and the feeding and forming of one cable will not interfere with the feeding and forming of the other cable.

Furthermore, the twisting arms and pulleys for guiding the cables thereover, of one cable will be counteracted or counterbalanced by the twisting arms and pulleys for the other cable thereby insuring a proper balance to the machine.

It will also be manifest that as the strands pass over the pulleys 25—29—31—27 carried by the respective arms they will be twisted with respect to each other, and as the cables advance and pass over the pulleys on the arms to the draw off mechanisms, the strands will be given a further twisting movement.

It will also be manifest that with this improved construction and as the cradle is held against rotary movement while the arms are rotated, there will be a reduction in the weight of the parts to be rotated and there will be provided a structure which will necessitate a considerable saving of power with respect to the power necessary to rotate the cradle and mechanisms of devices of this character heretofore employed.

Furthermore, the machine will materially reduce the cost of manufacture of the cables as two cables will be manufactured at the same time.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a wire rope or cable making machine, a cradle fixed against rotation, twister arms mounted adjacent each end of the cradle and for rotation independently with respect to the cradle, draw off mechanism and take up reels mounted upon the cradle individual to and intermediate the arms at the respective ends of the cradle, and means for rotating the arms with respect to the cradle for actuating the draw off mechanism and take up reels whereby a plurality of separate cables may be simultaneously formed by strands fed to the respective twisters, draw off mechanism and take up reels from the ends of the cradle opposite to the ends at which the respective draw off mechanisms and take up reels are located, the strands for each cable traveling the entire length of the cradle, said arms being rotatable on axes transverse to the axes of rotation of the draw off mechanisms and take up reels, the arms at each end of the cradle being arranged to counterbalance each other.

2. In a wire rope or cable making machine, a cradle, supporting means for the cradle, said cradle being maintained against rotation, oppositely disposed rotatable twisting arms constituting sets of arms arranged adjacent each end of the cradle, take up reels and haul off mechanisms mounted upon said cradle, individual to and intermediate the sets of arms at the ends of the cradle, a shaft separate from the cradle supporting means common to and connecting the arms at opposite ends of the cradle for rotating them independently with respect to the cradle, and constituting with said arms a unitary machine element.

3. In a wire rope or cable making machine, a cradle, supporting means for the cradle, said cradle being maintained against rotation, oppositely disposed rotatable twisting arms constituting sets of arms arranged adjacent each end of the cradle, take up reels and haul off mechanisms mounted upon said cradle, individual to and intermediate the sets of arms at the ends of the cradle, a shaft separate from the cradle supporting means, gear connections between said shaft and each of the said sets of arms for rotating them with respect to the cradle, said shaft and gear connections constituting with said arms a unitary machine element.

In testimony whereof I have signed my name to this specification, on this 18th day of November, A. D. 1931.

WILLIAM E. SOMERVILLE.